Patented Apr. 15, 1952

2,592,708

UNITED STATES PATENT OFFICE 2,592,708

METHOD OF MAKING CELLULAR RUBBER USING AMINES

John H. Kelly, Jr., Wabash, Ind., assignor to The General Tire and Rubber Company, Akron, Ohio, a corporation of Ohio No Drawing. Application September 18, 1947, Serial No. 774,884

4 Claims. (Cl. 260—2.5)

1

This invention relates to a method of making cellular or sponge rubbers by processes involving mill or mass-mixing of natural rubber or other butalastic polymer, to an improved blowing agent, and to a method of regulating the curing rate of rubber mixes. It also relates to a rubber compound having novel curing characteristics.

In my prior application Serial No. 748,280, filed May 15, 1947, of which this application is a continuation-in-part, I disclosed the preparation of cellular rubberlike materials by dispersing through a plastic rubbery polymer prior to the curing step a reaction product of an oil-compatible amine and carbon dioxide. I also disclosed in that application that the oil-soluble amines have a plasticizing effect on rubbery polymers and that mixtures of primary and secondary alkylamines may be utilized in conjunction with an accelerator to adjust the curing rate in any desired fashion, so that cell structure of the sponge and effectiveness of the blowing agent may be modified at will.

It has now been found in accordance with the present invention that the alkylamines are themselves blowing agents for sponge rubber and may be utilized to prepare blown sponge rubber of excellent quality, even in the absence of an additional gas-producing ingredient such as sodium carbonate, carbon dioxide, or the like.

In my prior application Serial No. 758,722, filed July 2, 1947, now Patent Number 2,564,401, of which this application is also a continuation-in-part, there is disclosed the advantage of utilizing as the main rubber polymer in the preparation of blown sponge rubber a butalastic compound that has a "Mooney" plasticity reading less than 25, a zero or relatively low gel content, and a dilute solution viscosity of less than 1.3. It has further been found in accordance with the present invention that when alkylamines are used as the principal blowing agent or as an auxiliary blowing agent, the sponge produced is superior when the polymer has these same characteristics, namely a zero or relatively low gel content, the high plasticity (low "Mooney" reading), and a dilute solution viscosity of less than 1.3.

It has also been found that as in the case where a reaction product of an amine with an auxiliary gas-producing material, such as an alkali metal carbonate, is used the pore size of the sponge produced and the cure characteristics of a rubber compound may be varied by proportioning primary and secondary alkylamines. The rate of cure is decreased by greater proportions of primary amines and is accelerated by increasing the relative proportion of secondary amines.

The oil-soluble, hydrocarbon-compatible amines, one or more of which are utilized as the main blowing agent in the production of sponge rubber in accordance with the present invention,

2 comprise (a) the mono-amines of saturated aliphatic and cyclo-aliphatic hydrocarbons, such as the mono-alkylamines having alkyl groups with a straight chain or branched chains of five or more carbon atoms, including for example amyl, butyl, hexyl, heptyl, octyl and dodecyl, isopropyl, methylamyl, methylbutyl, 2-ethylbutyl, 2-ethylhexyl and 2-aminoheptane amines and the mono-alicyclic amines such as cyclohexylamines, etc., and (b) the secondary amines having connected directly to and aminonitrogen two saturated hydrocarbon groups selected from alkyl and cycloalkyl having five or more carbon atoms and having straight or branched chains in either or both of the alkyl or cycloalkyl groups, including the dibutyl, diamyl, dihexyl, dioctyl, didodecyl, dimethylbutyl, dimethyloctyl, di-2-ethylbutyl, di-dodecyl- dicyclohexyl- and cyclohexyl-butyl-amines.

When one or more amines are utilized as the sole blowing agent, they should generally be present in amounts of at least 4 or 5%, based on the weight of the rubbery polymer, and about 10% or 8% to 12% is usually preferred, although as much as 15% or more may of course be present if economical consideration permits. When the amines are present in a rubber mix to serve only as a control of the rate of vulcanization, a total amount of 1 or 2% or so (based on the weight of the rubbery polymer) is usually sufficient.

When a sponge rubber of large pore size is desired, the amount of primary amines should substantially predominate and the amount of secondary amine should not appreciably exceed more than 5% of the total amine content. When a very fine pore size is desired, the amount of primary amine should not exceed about 60% of the mixture, and equal parts of primary and secondary amines or the secondary amine alone are preferred. With increasing amount of secondary amine, however, acceleration may become so rapid that an advance state of cure occurs before blowing is accomplished, with the result that a relatively dense sponge is produced. By varying the quantities of primary and secondary amines, both pore size and density may be readily controlled.

While as aforementioned the hydrocarbon-compatible (soluble in hydrocarbon oils) aliphatic amines, particularly those oil-soluble alkylamines which have five or more carbon atoms in an alkyl group, are preferably used as the sole amine compound in the present invention, it has also been found that mixtures of oil-soluble or hydrocarbon-compatible amines with hydrocarbon oil-insoluble amines also function satisfactorily when the amount of hydrocarbon-soluble amine in the mixture is sufficient to render the admixture of amines hydrocarbon-soluble or rubber-compatible. Thus, mixtures of amylamine and propylamine having about 50% or more of amylamine may be used so that the amylamine carries the rubber-incompatible amine throughout the rubber compound.

As mentioned above, the rubbery polymer which serves as the flexible base of the porous rubber products of the present invention may be any of the unvulcanized, vulcanizable butalastic polymers or copolymers compatible with the amine. These include Hevea rubber and polymers of butadiene with an arylvinyl compound, such as styrene, alpha-methylstyrene, 3,4-dichloro-alpha-methylstyrene, parachlorostyrene, parachloro-alpha-methylstyrene and other nuclear-halogenated styrenes. The copolymers are indeed generally even more desirable than natural rubber in the present invention. This is particularly the case when one copolymerizes a butadiene compound, such as butadiene-1,3 and/or isoprene, with one or more arylvinyl compounds, such as styrene, in the presence of a substantial amount of a modifier, such as the conventional dodecyl mercaptan, hexyldecyl mercaptan, etc., so that a polymer characterized by having (a) a plasticity reading between 4 or 5 and 25 or 30 on a "Mooney" shearing disc plastometer, (b) a dilute solution viscosity below 1.3, and (c) a gel content of about zero (less than 10% gel) is produced. I have found that these highly plastic, low or zero gel materials may be blown to exceptionally low density sponge rubbers, i. e. sponges having a density of .13 ounces per cubic inch or less, and that an increase in the amount of gel is detrimental to the production of low density sponge. In the case of natural rubber, such as Hevea rubber, a plasticity of between 20 and 35 (Mooney) is ordinarily sufficient without reference to gel content which is nonexistent in this class of polymer.

The highly plastic synthetic rubbery polymers prepared by other methods than by polymerization, as by milling synthetic rubber with or without peptizing or chemical plasticizing agents, such as dibenzoamido-diphenyl-disulfide, xylo mercaptans, etc., may also be used to produce sponge rubber of good quality in accordance with the present invention. But the gel content of such highly plasticized rubbery polymers thus produced is higher than in the highly modified polymers, and accordingly the density of the sponge rubber is generally not nearly as low as that produced with polymers produced in highly plastic form by the polymerization process directly.

The physical structure of a plasticized polymer, such as the rubbery copolymer of butadiene with styrene, i. e. the amount and character of gel or cross-linked portion in relation to the plastic noncross-linked portion, which is often termed the sol portion, as well as the character of the sol portion, may be readily determined by standard methods promulgated by Rubber Reserve Corporation, which methods involve extracting the noncross-linked or soluble rubber from any tough cross-linked rubber by means of a solvent for the polymer, filtering and weighing the separated portions. Such extraction readily gives the proportions of the cross-linked or tough rubber material and the proportions of soluble or noncross-linked plastic polymeric material. The character of the sol portion is empirically measured by measuring the dilute solution viscosity of the solutions formed by the rubbery polymer.

Specifically, the recommended procedure is to add .4 gram of thinly sheeted rubbery polymer to a bottle containing 100 cubic centimeters of pure benzene, and after allowing the bottle to remain in a dark room for forty-eight hours, filtering the resultant solution through 100-mesh screen and collecting the filtrate. 25 cc.'s of the filtrate thus collected are evaporated to dryness and weighed. The amount of gel is the weight of the original sample, minus four times the weight of the residue remaining after such evaporation of the solvent. The dilute solution viscosity or intrinsic viscosity is obtained by measuring the ratio of the time required for a given amount of the aforementioned filtrate to flow through a given capillary to the time required for the same amount of pure benzene to flow through the same capillary; dilute solution viscosity is then equal to 2.3 times the log (base 10) of the above ratio, divided by the concentration in grams of polymer per 100 cc.'s of the above filtrate.

The "Mooney" plastometer is described in an article entitled "A Shearing Disc Plastometer for Unvulcanized Rubber" by Melvin Mooney, published in Industrial and Engineering Chemistry, Anal. Ed., 6, 147 (1934). The measurement of plasticity standards is also described in the "Government Specifications for Synthetic Rubbers," July 1945.

Although high pigment loading has previously been considered undesirable in making sponge rubbers, I have found it to be highly desirable in the case when the above-described highly plastic polymers are used. The pigments like whiting and certain large particle size blacks, such as "Gastex," which have a particle size greater than 35 millimicrons improve the quality of the sponge and facilitate handling during processing. Around 3 to 10 parts of flocculated cellulose, with or without other pigment, is also especially desirable in reducing cold flow after extrusion of these sponge-forming mixtures.

In the preparation of rubber compounds in accordance with the present invention, the amines or mixtures of amines are preferably milled or masticated with the well-plasticized butalastic material such as a well-plasticized butadiene-styrene copolymer, or preferably a highly plastic butadiene-styrene copolymer prepared directly in the highly plastic form by polymerization in the presence of a substantial amount of mercaptan or other modifying agent, as above-described. Prior to the addition of the amine, the rubbery polymer is preferably compounded with the desired amounts of pigments, curing agents, activators, accelerators, antioxidants and the like. If it is desired to utilize a compound thus produced in the production of sponge rubber, it is cured under conditions allowing an increase in volume.

The following examples, in which parts are by weight, illustrate the present invention.

*Example 1*

| | Parts |
|---|---|
| GRS (a butadiene-styrene copolymer manufactured by Rubber Reserve Corporation | 100.00 |
| Dibenzoamido-diphenyl-disulfide | 2.00 |
| Whiting | 50.00 |
| Sulfur | 3.50 |
| Butyraldehyde-amine (accelerator) | .60 |
| Tetramethyl-thiuram-monosulfide | .06 |
| Zinc oxide | 5.00 |
| Stearic acid | 5.00 |
| Plasticizing oils | 35.00 |
| N-octylamine | 10.00 |

The butadiene-styrene copolymer containing 75% of butadiene and 25% of styrene, was masticated in a No. 9 Banbury for twenty minutes in the presence of the dibenzoamido-diphenyl-disulfide and the whiting at a temperature of 275° to 280° F. The plasticized product had an average dilute solution viscosity below .90 and a 20 to 25% gel content. The other ingredients above shown were added to the plasticized material in conventional manner to obtain a curable rubber compound. Varying weight samples of rubber compounds thus obtained were cured in a 1.5" x 7" cylindrical mold and cellular rubbers having a density between .15 and .165 ounces per cubic inch were obtained in the molds filled completely with sponge.

*Example 2*

Two batches of Hevea rubber were compounded in accordance with the batches shown as "A" and "B" in the following table:

| | Batch A | Batch B |
|---|---|---|
| Smoked sheets | 106.00 | 100.00 |
| Dibenzoamido-diphenyl-disulfide | .75 | .75 |
| Whiting | 50.00 | 50.00 |
| Sulfur | 2.50 | 3.50 |
| Stearic Acid | 5.00 | 5.00 |
| Zinc Oxide | 5.00 | 5.00 |
| Ditolylamines (antioxidant) | 1.00 | 1.00 |
| Butyraldehyde-Amire | .60 | 1.00 |
| Tetramethyl-thiuram-monosulfide | .06 | .10 |
| 150 Micron Cellulose Fibre | 10.00 | |
| Plasticizing Oils | 35.00 | 25.00 |
| Octylamine | 10.00 | |
| Hexylamine | | 10.00 |

The smoked sheets (Hevea rubber) were plasticized twenty minutes in a Banbury at a temperature of 280° to 300° F. in the presence of the whiting and the dibenzoamido-diphenyl-disulfide. The additional ingredients were added on a mill in accordance with usual compounding practice, care being taken to add the accelerator near the end of the mixing period.

Small pieces of the rubber compounds thus produced were incorporated into the molds, described in Example 1, varying amounts being placed in different molds to determine that quantity which blows just sufficiently to completely fill the molds. Density of sponge rubber samples thus obtained averaged .12 ounces per cubic inch after vulcanization for fifteen minutes at sixty pounds steam pressure.

*Example 3*

A GRS (a butadiene-styrene copolymer) having a plasticity of 17 to 25 when measured on a Mooney plastometer, and further characterized by having a dilute solution or intrinsic viscosity of 1.3 and a gel content of around zero, was compounded in latex form with 25%, based on the weight of the polymer, of a semi-reinforcing carbon black (Gastex) by mixing an aqueous dispersion of the black with a latex and coagulating the product with an acidic coagulant such as a mixture of salt and sulfuric acid in accordance with standard practice in synthetic rubber plants of the Reconstruction Finance Corporation. The coagulum thus produced was dried and divided into five batches. The batches were compounded with mastication in a Banbury or rubber mill with the respective amounts of compounding ingredients shown in the following table:

| | Batches | | | |
|---|---|---|---|---|
| | B | C | D | E |
| Dried Coagulum From Above (Polymer 100 parts; Semi-reinforcing Furnace Black 25 parts) | 125 | 125 | 125 | 125 |
| Sulfur | 3.5 | 3.5 | 3.5 | 3.5 |
| Zinc oxide | 5.0 | 5.0 | 5.0 | 5.0 |
| Stearic Acid | 5.0 | 5.0 | 5.0 | 5.0 |
| Ditolylamines (antioxidant) | 1.0 | 1.0 | 1.0 | 1.0 |
| Butyraldehyde-amine | .6 | .6 | .6 | .6 |
| Tetramethyl-thiuram-monosulfide | .06 | .06 | .06 | .06 |
| Plasticizing oils | 35.00 | 35.00 | 35.00 | 35.00 |
| Mono-amylamine | 10.0 | | | |
| N-hexylamine | 10.0 | | | |
| 2-amino-heptane | | 10.0 | | |
| 2-ethylbutylamine | | | 10.0 | |
| Coconut Oil Amines [1] | | | | 10.0 |

[1] Consisting essentially of 0.2% hexyl, 8% octyl, 7% decyl, 48% dodecyl, 18% tetradecyl, 8% hexadecyl, 2% octadecyl and 8% octadecenyl primary amines.

The stock obtained from each of the batches B, C, D and E was cured in control molds as described in Example 2 and sponge rubber having a density of about .115 ounces per cubic inch was obtained.

In the foregoing examples, the primary alkylamines were generally slow in vulcanizing and accordingly many of the pores coalesced together before the rubber had sufficient strength or "firm-up" to maintain very thin cell walls. This resulted in a sponge having a characteristically large cell structure.

*Example 4*

A rubber-black coagulum, identical with that described in Example 3 above, was divided into seven batches. These batches were respectively compounded with the amounts of ingredients indicated in the following table:

| Batch Nos. | A | B | C | D | E | F | G |
|---|---|---|---|---|---|---|---|
| Coagulum (Polymer 100 Parts; Semi-reinforcing Furnace Black 25 Parts) | 125 | 125 | 125 | 125 | 125 | 125 | 125 |
| Sulfur | 3.5 | 3.5 | 3.5 | 3.5 | 3.5 | 3.5 | 3.5 |
| Zinc Oxide | 5.0 | 5.0 | 5.0 | 5.0 | 5.0 | 5.0 | 5.0 |
| Stearic Acid | 5.0 | 5.0 | 5.0 | 5.0 | 5.0 | 5.0 | 5.0 |
| Butyraldehyde Amine | .6 | .6 | .6 | .6 | .6 | .6 | .6 |
| Tetramethyl-thiuram-monosulfide | .06 | .06 | .06 | .06 | .06 | .06 | .01 |
| Plasticizing Oils | 35.00 | 35.00 | 35.00 | 35.00 | 35.00 | 35.00 | 35.00 |
| Dihexylamine | 10.00 | 5.00 | | | | | |
| N-hexylamine | | 5.00 | | | | | |
| Di-2-ethyl butylamine | | | 10.00 | 5.00 | | | |
| 2-ethyl butylamine | | | | 5.00 | | | |
| Di-amylamine | | | | | 10.00 | | |
| Dibutylamine | | | | | | 10.00 | |
| Dicyclohexylamine | | | | | | | 10.00 |
| Average cellular densities (ounces/cubic inch) | (1) | .095 | .31 | .16 | .108 | .167 | .214 |

[1] Failed to blow to .31 03/cubic inch density established as maximum control weight.

The rubber compounds were cured in molds as in Example 2 and densities indicated in the table were obtained for the sponge rubbers thus produced.

It will be seen from the above table that the accelerating influence of the secondary saturated aliphatic amines, including the dialicyclic amines, such as dicyclohexylamine, is strongly illustrated in the product of batches A, C and G. The cell structure in the product obtained is extremely small. When suitable primary alkylamines are added as in the case of batches B and D, sufficient cure retardation is present to more than double the inflation rise which occurs. In many cases, by adjusting the amine ratios or proportions (taking into consideration the activity of the accelerator), I have produced sponge rubbers having densities as low as .066 ounces per cubic inch. The curing of the amine containing polymer takes place at temperatures sufficient to cause volatilization of at least some of the amines present.

It is to be understood that variations and modifications of the invention herein shown and described may be made without departing from the spirit of the invention.

What I claim is:

1. In a method of producing a cellular rubber wherein a rubbery polymer of polymerizable conjugated aliphatic diolefine in plastic form is mixed with compounding and curing agents and cured under conditions permitting an increase in volume, the steps which comprise incorporating in the plastic rubber polymer at least one aliphatic hydrocarbon-compatible saturated amine which is volatile at curing temperatures for rubber and has connected to aminonitrogen at least one hydrocarbon group having five to 12 inclusive carbon atoms and selected from the group consisting of aliphatic and cycloaliphatic saturated hydrocarbon groups, said amines consisting of carbon, hydrogen and nitrogen, subjecting the rubbery polymer thus formed to an elevated temperature to cause the volatilization of said amine and expansion of the rubbery polymer, allowing the heated rubbery mixture to expand and finally curing the rubbery polymer in the expanded condition, said amines being the sole blowing agent in said rubbery mixture.

2. The method of producing a cellular rubber of relatively low density which comprises forming a mixture of a rubbery polymer of a conjugated diolefine characterized by having a viscosity between 5 and 25 on the Mooney plastometer, an intrinsic viscosity below 1.3 and a low gel content with at least one aliphatic hydrocarbon oil compatible saturated amine having connected to aminonitrogen at least one hydrocarbon group having five to 12 inclusive carbon atoms and selected from the group consisting of aliphatic and cycloaliphatic saturated hydrocarbon groups, said amine consisting of carbon, hydrogen and nitrogen, being volatile at curing temperatures and being the sole blowing agent present, heating and curing the mixture under conditions which permit expansion of the mixture and cause volatilization of at least a portion of said amine as evidenced by a density of the cured rubber which is substantially lower than that of the rubbery polymer mixture just prior to the curing step.

3. In a method of producing articles wherein a polymer of a conjugated diolefine is compounded with a curing agent, accelerator and at least one pigment, and cured with the aid of heat and pressure, the step which comprises regulating the pore size by incorporating in the polymer a mixture of primary and secondary amines volatile at curing temperatures consisting of carbon, hydrogen and nitrogen and having connected directly to amine nitrogen at least one member of the group consisting of alkyl and cycloalkyl having at least five and not in excess of 12 carbon atoms, said groups being the only groups connected to said nitrogen, and subjecting the resultant polymer mixture to elevated temperature sufficient to cause curing thereof and permitting expansion of the mixture, said amines being the sole blowing agents present.

4. The method of claim 3 wherein the primary and secondary amines are present in about equal quantities and the amount of the amine present is at least 5 per cent of the weight of the rubbery polymer.

JOHN H. KELLY, JR.

REFERENCES CITED

The following references are of record in the file of this patent:

UNITED STATES PATENTS

| Number | Name | Date |
|---|---|---|
| 1,296,469 | Boggs | Mar. 4, 1919 |
| 1,912,591 | Olin | June 6, 1933 |
| 2,234,204 | Starkweather et al. | Mar. 11, 1934 |
| 2,261,459 | Cooper et al. | Nov. 4, 1941 |
| 2,478,879 | Ten Broeck | Aug. 9, 1949 |

FOREIGN PATENTS

| Number | Country | Date |
|---|---|---|
| 576,271 | Great Britain | Mar. 27, 1946 |

OTHER REFERENCES

Bennett, Concise Chemical and Technical Dictionary, Chemical Publishing Co., 1947, page 24.

Du Pont, Sponge Rubber Compounding Report No. 38-6, June 1938, page 5.

Du Pont, Sponge Rubber Compounding Report No. 38-6, June 1938, pp. 1 to 3.

Breckley, India Rubber World, August 1946, pp. 663 to 665.